(12) United States Patent
Li et al.

(10) Patent No.: US 9,773,192 B2
(45) Date of Patent: Sep. 26, 2017

(54) FAST TEMPLATE-BASED TRACKING

(71) Applicant: Apple Inc., Cupertino, CA (US)

(72) Inventors: Xiaoxing Li, San Jose, CA (US);
Geoffrey T. Anneheim, San Francisco, CA (US); Jianping Zhou, Fremont, CA (US); Richard D. Seely, San Francisco, CA (US); Marco Zuliani, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 201 days.

(21) Appl. No.: 14/732,738

(22) Filed: Jun. 7, 2015

(65) Prior Publication Data
US 2016/0358341 A1 Dec. 8, 2016

(51) Int. Cl.
*G06K 9/00* (2006.01)
*G06K 9/62* (2006.01)
*G06T 3/40* (2006.01)
*G06T 7/13* (2017.01)
*G06T 7/246* (2017.01)
*G06T 7/90* (2017.01)

(52) U.S. Cl.
CPC .............. *G06K 9/6202* (2013.01); *G06T 3/40* (2013.01); *G06T 7/13* (2017.01); *G06T 7/248* (2017.01); *G06T 7/90* (2017.01); *G06T 2207/10016* (2013.01); *G06T 2207/10024* (2013.01)

(58) Field of Classification Search
None
See application file for complete search history.

(56) References Cited

U.S. PATENT DOCUMENTS

| 6,724,915 | B1 | 4/2004 | Toklu | |
| 8,611,591 | B2 | 12/2013 | Coffman | |
| 8,768,046 | B2 | 7/2014 | Ernst | |
| 2004/0247028 | A1* | 12/2004 | Kim | H04N 5/145 375/240.16 |
| 2009/0303342 | A1* | 12/2009 | Corcoran | G06K 9/00228 348/222.1 |
| 2010/0316298 | A1* | 12/2010 | Swaminathan | G06K 9/621 382/209 |

(Continued)

OTHER PUBLICATIONS

Comaniciu, et al., "Kernel-Based Object Tracking," IEEE Transactions on Pattern Analysis and Machine Intelligence, vol. 25, Issue: 5, May 2003.

*Primary Examiner* — Sean Conner
(74) *Attorney, Agent, or Firm* — Blank Rome LLP

(57) ABSTRACT

Techniques to identify and track a pre-identified region-of-interest (ROI) through a temporal sequence of frames/images are described. In general, a down-sampled color gradient (edge map) of an arbitrary sized ROI from a prior frame may be used to generate a small template. This initial template may be used to identify a region of a new or current frame that may be overscan and used to create a current frame's edge map. By comparing the prior frame's template to the current frame's edge map, a cost value or image may be found and used to identify the current frame's ROI center. The size of the current frame's ROI may be found by varying the size of putative new ROIs and testing for their congruence with the prior frame's template. Subsequent ROI's for subsequent frames may be identified to, effectively, track an arbitrarily sized ROI through a sequence of video frames.

24 Claims, 7 Drawing Sheets

(56) References Cited

U.S. PATENT DOCUMENTS

2012/0070089 A1\* 3/2012 Yamada ............... G06K 9/6255
　　　　　　　　　　　　　　　　　　　　　　　382/209
2015/0063628 A1　 3/2015 Bernal
2015/0206004 A1\* 7/2015 Liang ................... G06K 9/6212
　　　　　　　　　　　　　　　　　　　　　　　382/103

\* cited by examiner

FAST TEMPLATE-BASED TRACKING

BACKGROUND

This disclosure relates generally to the field of computer vision and video processing. More particularly, but not by way of limitation, this disclosure relates to a technique for tracking an initially defined region-of-interest (ROI) through a sequence of frames or images using a small template. While the term "frame" is generally used when describing a temporal sequence of images (e.g., video), the terms "image" and "frame" are taken herein to mean the same thing: a two-dimensional arrangement of pixels.

The ability to track a moving object or an arbitrarily sized ROI through a sequence of frames is important for many image analysis tasks such as, for example, dynamic auto-focus and/or auto-exposure operations. Tracking a region-of-interest between and over many frames in a sequence of frames requires that the region's representation be invariant, or invariant enough, to cope with the inherent changes due to object movement and/or camera movement (e.g., translation, rotation and occlusion). Further, any such operations must be able to take place in real-time, during image capture. Current technology does not provide adequate solutions to these issues in many instances.

SUMMARY

In one embodiment the disclosed concepts provide a method to track a pre-identified region-of-interest (ROI) through a temporal sequence of frames or images. In one embodiment, the pre-identified ROI may comprise a moving object. In another embodiment the pre-identified ROI may comprise a stationary object or a textured region, that changes its apparent or relative location through a sequence of frames due to, for example, camera shake or pan and zoom operations. Methods in accordance with this disclosure may begin by obtaining an initialization frame from a temporal sequence of frames having an identified ROI, the initial ROI having a known initial location (e.g., centroid) and a known initial size (e.g., x-by-y pixels); displaying the initial image and optionally the initial ROI (e.g., by presenting a visual "box" centered about the ROI's centroid); determining an initial template based on the initial ROI, where the initial template is centered about the initial location and has a size that is in general very small compared to the images in the sequence of images (e.g., 24-by-24 pixels or 48-by-48 pixels); receiving, and optionally displaying, a first frame from the temporal sequence of frames, the first frame arriving later in the temporal sequence of frames than the initialization frame; determining a first location of the first frame's ROI based on a congruence or similarity between the initial template and a region of the first frame; selecting one of a plurality of different sized regions of the first frame as a size of the first ROI based on a congruence between each of the plurality of different sized regions and the initial template; and optionally updating the display of the first frame with a visual indication of the first ROI. Stepping through subsequent frames of the temporal sequence of frames and retaining that ROI and template corresponding to the determined ROI and template that best matches prior determinations allows the object originally identified by the initial ROI to be tracked through the sequence of frames.

In one embodiment the initial template comprises a down-sampled color gradient (edge map) of the initial, arbitrarily sized, ROI. In another embodiment, the location of the first frame's ROI may be found by overscanning (e.g., by a small factor such as 2, 3 or 4) a region of the first frame coinciding with the initial ROI; determining the similarity between the initialization frame's template and the current frame's overscan region to construct cost function image, where the cost function image has a 1:1 correspondence with the overscan region of the first frame; and selecting that position in the first image corresponding to the location in the cost function image having the largest (or smallest) value. In one embodiment the cost function image may be generated by determining the cross-correlation (or a computationally equivalent/similar function) between the initial template and sub-regions within the overscan region (where the size of the sub-regions correspond to the size of the initial template). In one embodiment the size of the first image's ROI may be determined by testing a variety of different sized regions of the first image centered about the first image's previously determined ROI centroid. The congruence or similarity between each of these different sized regions and the initial template may be used to generate a score, where the first image's ROI size may be selected as that size corresponding to the highest or best score. In yet another embodiment, adaptation of the current or initialization frame's template may be provided. Adaptation may take place, for example, after every X frames are processed and/or whenever one frame's template is sufficiently different from that of the prior frame's template. The disclosed methods may be implemented as computer program code or instructions that may be stored in any media that is readable and executable by a computer system. In addition, some or all of the disclosed techniques may be implemented in (specialized) hardware.

DETAILED DESCRIPTION

This disclosure pertains to systems, methods, and computer readable media to rapidly identify and track a pre-identified region-of-interest (ROI) through a temporal sequence of frames/images such as that obtained, for example, during video capture operations. In general, a down-sampled color gradient (edge map) of an arbitrary sized ROI from a prior frame may be used to generate a small template. In a following or "current frame," the color gradient (edge map) of an scan region identified by the prior frame's ROI may then be determined. By comparing the prior frame's template to the current frame's edge map, a cost value or image may be found and used to identify a ROI center in the current frame. The size of the current frame's ROI may then be found by varying the size of putative new ROIs and testing for their congruence with the prior frame's template. In addition, one or more edge maps computed from the ROI tracked in prior frames may be used to update the current template to yield a tracking system that is robust to perspective change and complex backgrounds. In addition, tracking quality metrics may be used to determine when the tracking system has "lost sync" with the ROI being tracked.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation are described. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

It will be appreciated that in the development of any actual implementation (as in any software and/or hardware development project), numerous decisions must be made to achieve the developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design and implementation of image analysis and object tracking systems having the benefit of this disclosure.

Figure 1:
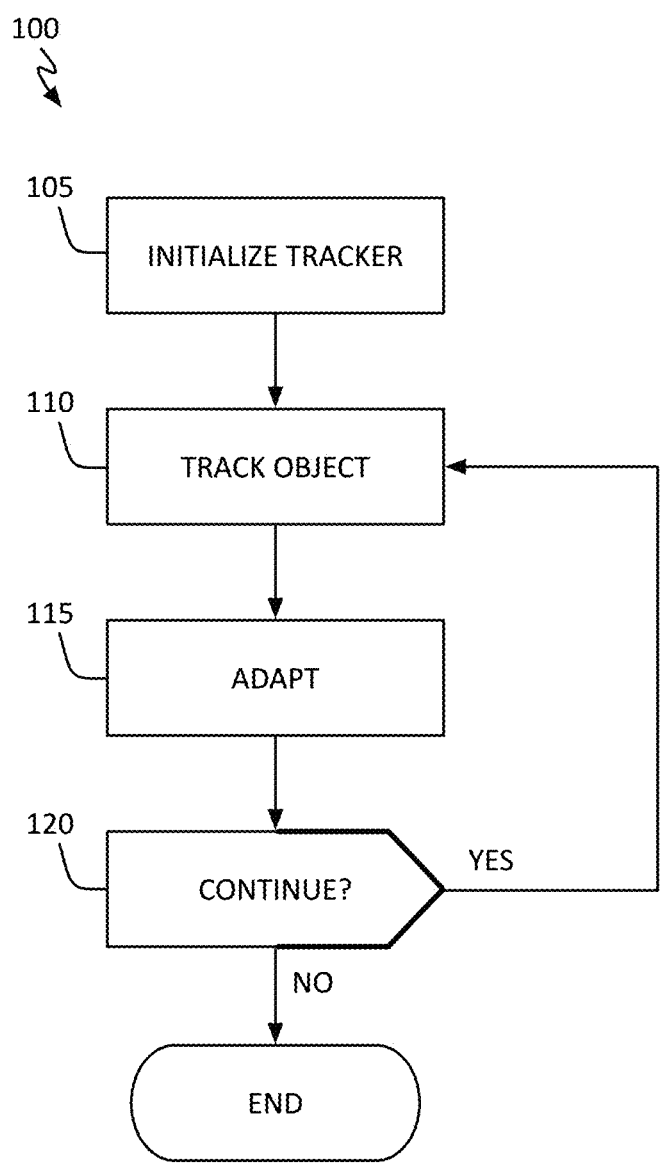
FIG. 1 shows, in flowchart form, a region-of-interest (ROI) tracking operation in accordance with one embodiment.

Referring to FIG. 1, ROI tracking operation 100 in accordance with this disclosure initializes itself by determining an initial template based on a given ROI (block 105). For example, the given ROI may be identified by the location of its centroid and its vertical and horizontal extent within a given or current frame. From that point forward, the region identified by the initial ROI may be followed through succeeding frames by updating the ROI (block 110). The ROIs identified in accordance with block 110 may be updated or adapted over time (block 115), where after a check may be performed to determine if tracking is to be continued (block 120). If ROI tracking is to be continued (the "YES" prong of block 120), operation 100 continues at block 110, otherwise it may be terminated (the "NO" prong of block 120).

Figure 2:
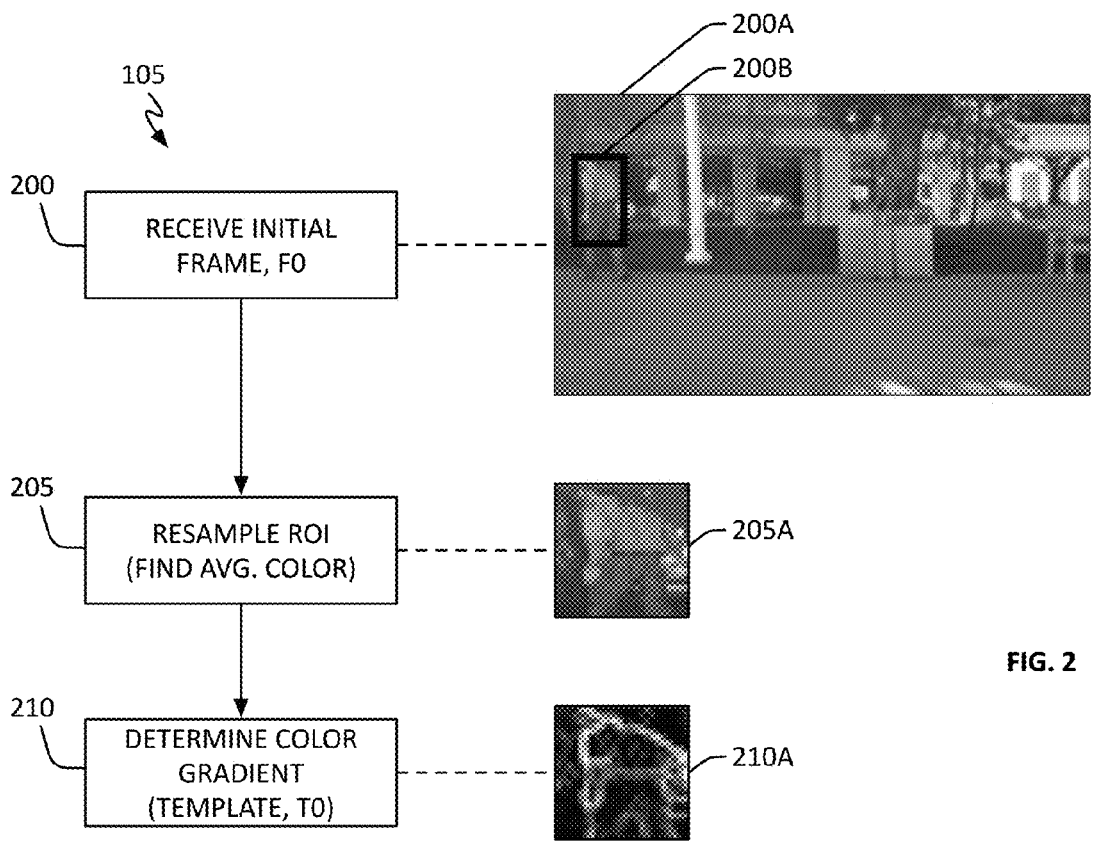
FIG. 2 shows, in flowchart form, an initialization operation in accordance with one embodiment.
Figure 3:
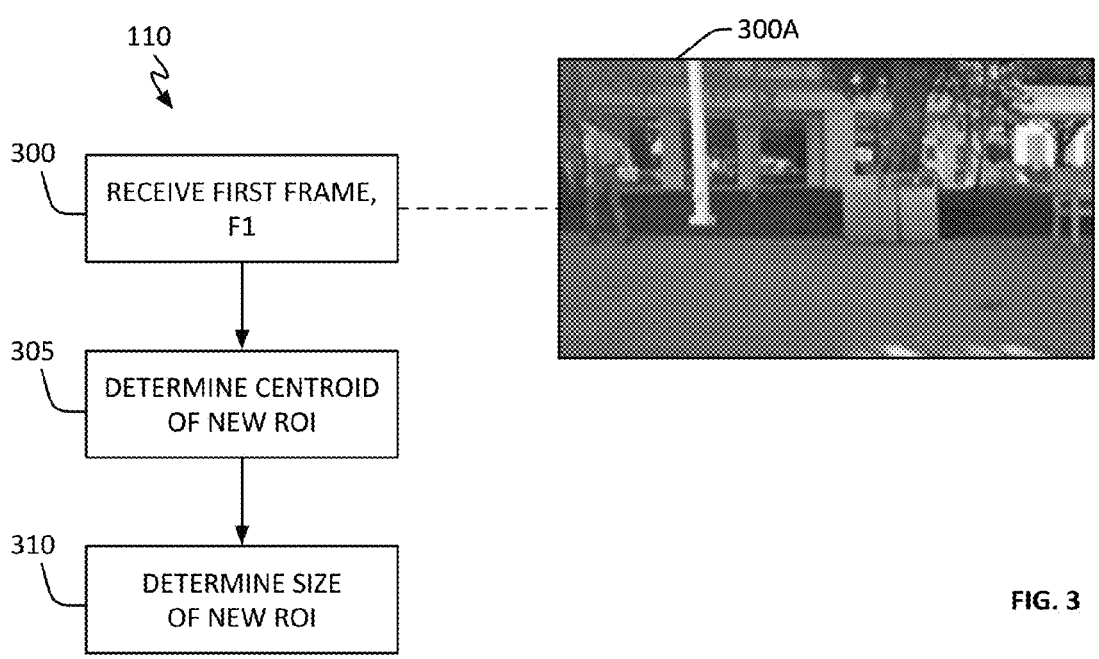
FIG. 3 shows, in flowchart form, an ROI tracking operation in accordance with one embodiment.

Referring to FIG. 2, initialization operation in accordance with block 105 may begin with reception of initialization frame F0 200A—referred to herein as the "prior" frame or image—which may also include identification of the frame's ROI 200B (block 200). The area of ROI 200B may then be down-sampled using certain interpolation rules (e.g., nearest neighbor, bilinear, bicubic, multi scale pyramid) to generate N-by-N region 205A and the average color (more generally, a color descriptor) of that region determined (block 205). In general, N may be much smaller than ROI 200B and much, much smaller than frame F0 200A. In one illustrative embodiment, frame 200A may be 3,264-by-2,448 pixels (8 Mp), ROI 200B may be on the order of 200-by-300 pixels, and N may be on the order of 20 or some other small number (e.g., 25, 30). It should be noted however, that no such size limitation is implied: ROI 200B may be any arbitrary sub-region of frame 200A. The color gradient of region 205A may be determined to generate template T0 210A (block 210). In one embodiment, template T0 210A may be the down-sampled color gradient of region 205A (the edge map of region 205A) in any choice of color space, including gray. In another embodiment, the color gradient may comprise a multi-channel (signed) edge image or map. In still another embodiment, the color gradient may comprise a single-channel gradient field. Referring to FIG. 3, tracking operation 110 may begin on receipt of a frame subsequent to that of frame F0; referred to herein as frame F1 300A, the "current" frame or image (block 300). The centroid and extent or size of the current frame's ROI, based on the prior frame's template T0 210A, may be determined through each succeeding image to, in effect, track the region targeted by the prior frame's ROI 200B (blocks 305 and 310).

Figure 4:
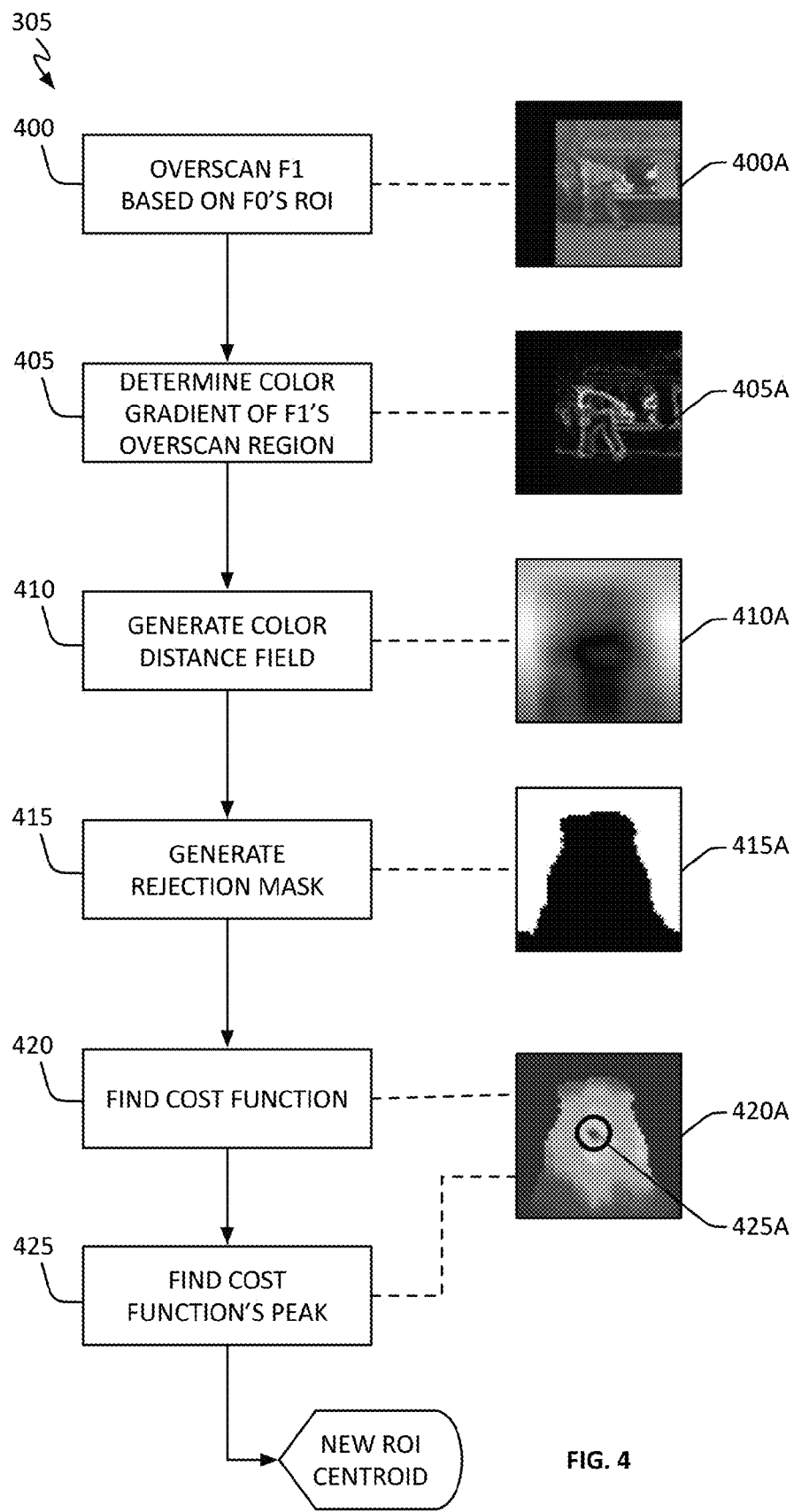
FIG. 4 shows, in flowchart form, a ROI centroid determination operation in accordance with one embodiment.

Referring to FIG. 4, ROI centroid determination operation 305 may first generate overscan region 400A from current frame F1 300A, where the overscan may be centered about the prior frame's ROI 200B (block 400), and the sampling density may be the same as that used to get the prior frame's down-sampled ROI 205A. In one embodiment, overscan region 400A may be mN-by-mN pixels, where m equals a small integer value (e.g., 2 to 10) and N represents the width/height of the prior frame's template T0 210A. As used herein, the term "overscan" is taken to mean over-scanned and then down-sampled. The color gradient of overscan region 405A may then be found (block 405), and color distance field 410A generated based on comparing the average color in each N-by-N sub-region within overscan region 400A to the average color of the prior frame's ROI region 200B (block 410). In one embodiment, distance field 410A comprises a color distance value for each centroid point of each N-by-N sub-region within overscan region 400A. Rejection mask 415A may be determined by applying a threshold to each value in distance field 410A (block 415). In one embodiment, rejection mask 415A has a '1' value in each location the corresponding value in distance field 410A is less than a specified threshold value and a '0' value in all other locations. In one embodiment the threshold value may be a fixed or pre-specified value based on the tracking system's design and operating environment. In another embodiment the threshold may be determined dynamically by, for example, identifying both the largest and smallest values in distance field 410A, and selecting that value a specified portion of the way between these two extremes. By way of example only, if distance field 410A's smallest value is 4, its largest value is 124, and the specified portion is 30%, the threshold could be set to 30% of the (124−4)=120 "point" range—(0.3)(120)=36. Accordingly, all values in rejection mask 415A corresponding to a value less than 36 in distance field 410A may be set to '1' with all other values set to '0'. (Although not necessary for implementation of the disclosed techniques, the usefulness of rejection mask 415A is noted below.)

With rejection mask 415A known, the similarity between the prior frame's template T0 210A and the current frame's overscan region 400A may be determined and used to construct cost function 420A within rejection mask 415A (block 420). In one embodiment, cost function 420A may be thought of as an image that has values in 1:1 correspondence with distance field 410A and/or rejection mask 415A. In one embodiment, the similarity between the prior frame's template T0 210A and the current frame's overscan region 400A may be expressed as the normalized cross-correlation between regions 210A and 400A. It may be understood that calculation of this normalized cross-correlation is computationally expensive. It has been found, quite unexpectedly, that an equally effective cost function may be given by:

$$J = \sqrt{\frac{\sigma\sigma' - \gamma + \mu\mu'}{2\sigma\sigma'}}, \text{ where} \quad \text{EQ. 1}$$

J represents the cost function, μ and σ represent the mean and standard deviation of the prior frame's template T0 210A respectively, λ' and σ' represent the mean and standard deviation of each N-by-N sub-region within overscan region 400A and the corresponding)(equals the dot-product of template T0 210A and each corresponding N-by-N sub-region of 400A. Clearly the field of γ is the result of a convolution between template T0 210A and each N-by-N sub-region of overscan region 400A. γ may be computed easily (and fast) using an FFT, while μ and σ may be pre-computed for template T0 and, μ' and σ' for the sub-regions within overscan region 210A, may be computed using the integral image. Surprisingly, EQ. 1 shows that a cost function indicative of the match between template T0 210A and overscan region 400A may be found without the need to directly compute the computationally costly normalized cross-correlation between the two regions or patches. With cost function 420A known, the centroid of the current frame's ROI may be given by the cost function's peak value 425A (block 425). In one embodiment, values for EQ. 1 may only be determined for those elements corresponding to non-zero valued rejection mask elements. In this manner, rejection mask 415A may be used to increase the efficiency of determining the current frame's ROI's centroid.

Figure 5:
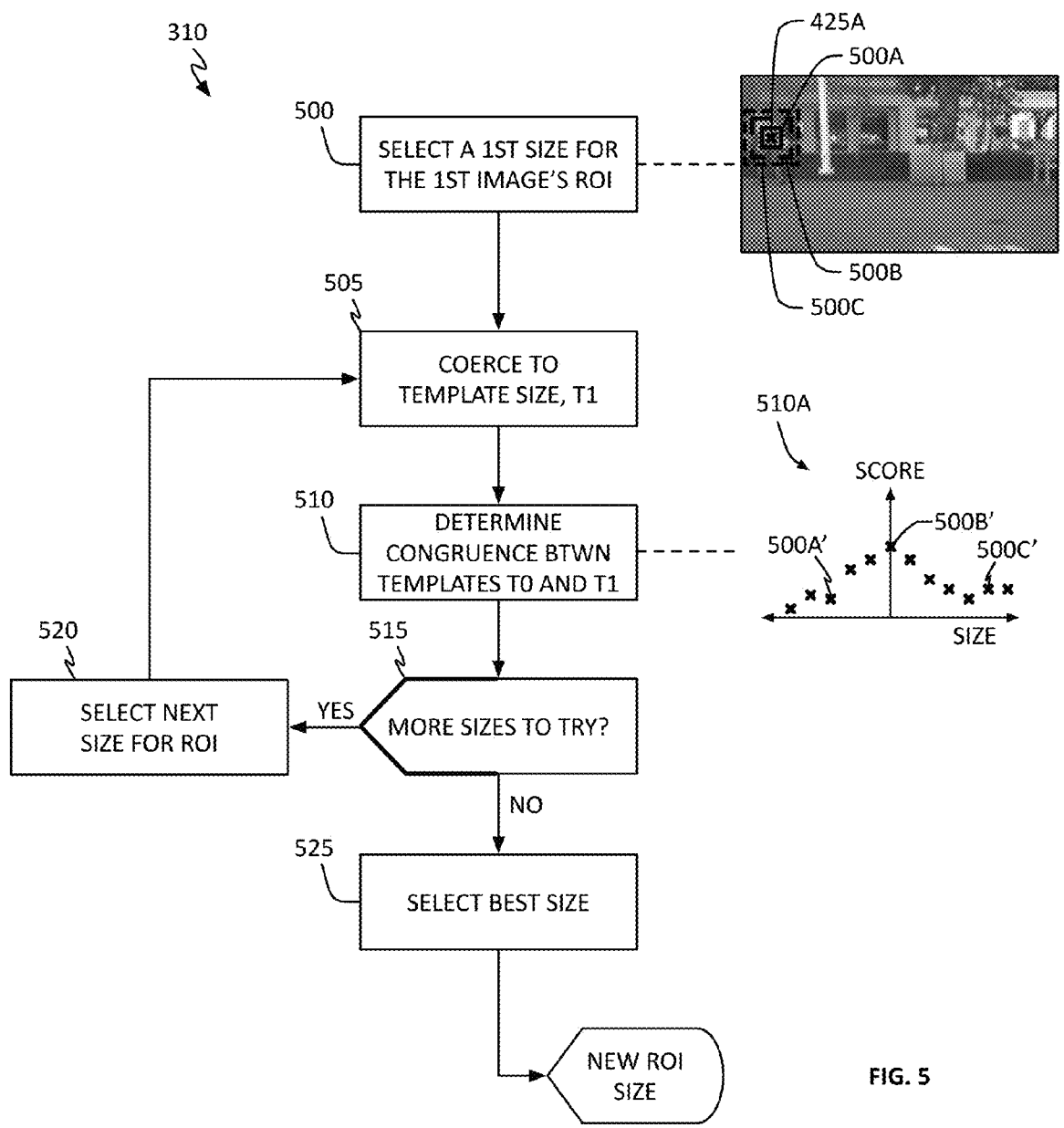
FIG. 5 shows, in flowchart form, a ROI size determination operation in accordance with one embodiment.

Referring to FIG. 5, ROI extent or size determination operation 310 in accordance with one embodiment may use the current frame's ROI centroid 325A determined in accordance with block 425. A first putative ROI size may be selected 500A (block 500) and coerced into a size equal to that of the prior frame's template T0 210A to create putative template T1 in the current frame F1 (block 505). The congruence or similarity between the prior frame's template T0 210A and different possible/putative templates of the current frame may then found 510A (block 510); where 500A' represents the score between T0 and putative ROI 500A, 500B' represents the score between T0 and putative ROI 500B, and 500C' represents the score between T0 and putative ROI 500C. In one embodiment, once re-sized to equal the size of the prior frame's template T0, the edge map for each of the different sized regions in the current frame, their congruence may be found by comparing edge map-to-edge map. In another embodiment the score corresponding to a given template T1 (e.g., 500A, 500B, and 500C) may be the normalized dot-product between T0 and T1: ∥T0·T1∥. It will be recognized that any metric indicative of the similarity between T0 and T1 may be used, the precise selection being dependent on the designer's operational goals, system constraints and operating environment. Once a score in accordance with block 510 has been found, a check to determine if all desired ROI sizes have been tried may be made (block 515). For example, sizes between 50% and 150% of the prior frame's ROI 200B may be used. In another embodiment, sizes between 75% and 125% of the prior frame's ROI 200B may be used. In still another embodiment, sizes between 95% and 110% of the prior frame's ROI 200B may be used. In each of these embodiments, the "gap" between successive ROI SIZES may be 0.5% or 1.0%, 2.0%, 5% or any other value deemed sufficient. If additional ROI sizes remain to be tested (the "YES" prong of block 515), the next size ROI may be selected (block 520) where after processing in accordance with block 505 may continue. If no additional putative ROI sizes remain to be evaluated (the "NO" prong of block 515), the best size ROI may be selected, where "best" may be determined in accordance with the scores found in block 510 (block 525). In the example indicted by scores 510A, score 500B' may be determined to be the best so that its size may be assigned to the current frame's ROI. At the completion of operations in accordance with block 525, the current frame's ROI is completely defined.

Figure 6:
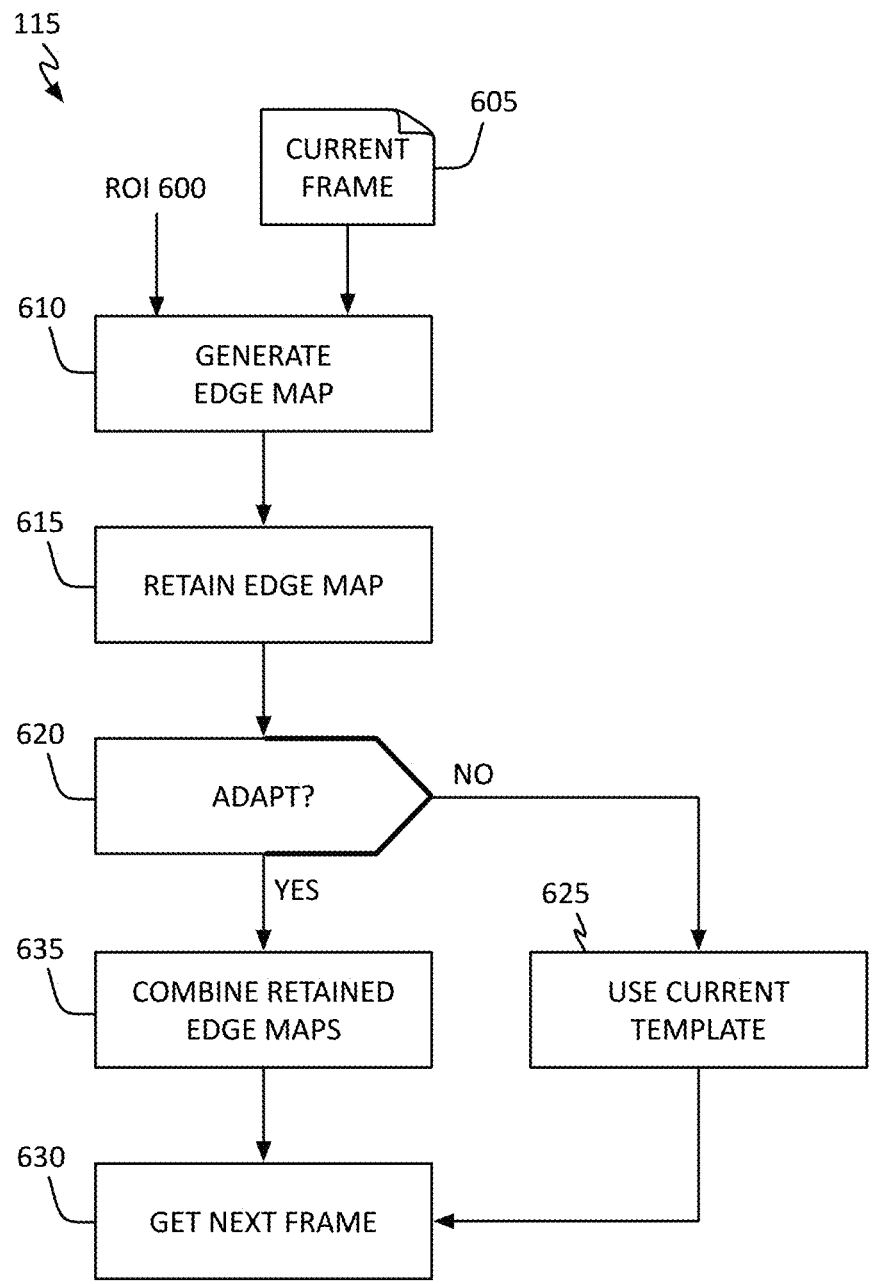
FIG. 6 shows, in flowchart form, an template adaptation operation in accordance with one embodiment.

Referring to FIG. 6, once the current frame's ROI has been determined as described above, adaptation operation in accordance with block 115 may begin by using the current frame's newly determined ROI 600 and current frame 605 (e.g., frame F1 300A) to generate a color gradient that corresponds to ROI 600 and is N-by-N in size (block 610). The generated edge map may be stored or retained in memory (block 615), where after a check may be made to determine if it is "time" to update the current template (block 620). If it is not yet time to update or adapt the current template (the "NO" prong of block 620), the current template may be used again (block 625) as the next frame in the temporal sequence of frames is acquired and processed in accordance with FIGS. 1-5 (block 630). If, on the other hand it is time to update the current template (the "YES" prong of block 620), at least some of the edge maps retained in accordance with block 615 may be combined (block 635) and used as the current template when obtaining and processing the next frame (block 630).

In one embodiment retention of edge maps in accordance with block 615 may utilize an M-slot circular queue. In this embodiment as each new edge map is inserted into the queue, prior retained edge maps "move down" the queue until it is fully populated with M edge maps. At that point it may become time to adapt or update the current template. In one embodiment all M of the currently retained edge maps may be combined in accordance with block 635. In another embodiment less than all of the retained edge maps may be used. Once updated a first time, the current template may be updated thereafter whenever desired. For example, after every frame, after every X frames, or at specified times. Specified times may be identified by "triggering" events. Illustrative trigger event may include, but are not limited to, the current frame's template (determined, for example, in accordance with block 610) differing from the active template (i.e., that template used to analyze the current frame) by at least a specified amount, detecting multiple peaks during template congruence check operations in accordance with block 510, determining if there is a sufficiently large peak in accordance with block 525, and finding that the identified template does not provide enough features to enable tracking. What "values" are used to determine each of these factors will, of course, depend upon the system's design criteria. In applications developed for video captured at a rate of between approximately 15-100 frames per second, it has been found that ROI tracking operations in accordance with this disclosure operate smoothly when M is chosen to be some small value between 3 and 12. In other embodiments, the memory need not be a circular queue. For example, the memory may be a simple array, a table or any other suitable data structure that meets the needs of a particular implementation.

Referring again to FIG. 6, it is envisioned any technique that may be used to combine multiple edge maps (e.g., gradient or color gradient images) into a new template may be used in accordance with block 635. In one particular embodiment, the semi-soft GoDec algorithm may be used to reduce noise and merge common features in the edge maps being combined. See "Shifted Subspaces Tracking on Sparse Outlier for Motion Segmentation" by Tianyi Zhou and Dacheg Tao. August 2013, IJCAI'13: Proceedings of the Twenty-Third International Joint Conference on Artificial Intelligence, pp. 1946-1952. In still another embodiment, the running average may be used. Referring now to block 630, in one embodiment the current template's average color used during operations in accordance with FIGS. 2-5 may be the initial template's calculated average color as described above in accordance with block 205. This has been found viable because it is typically the case that the color of the ROI being tracked does not change significantly over the time periods being tracked. If, however, it was considered important to capture this aspect this could be done by determining an average color during acts in accordance with block 610 and then during combine operations in accordance with block 635 those colors could be merged. For example, their algebraic average could be used. In another embodiment, their weighted average could be used.

Figure 7:
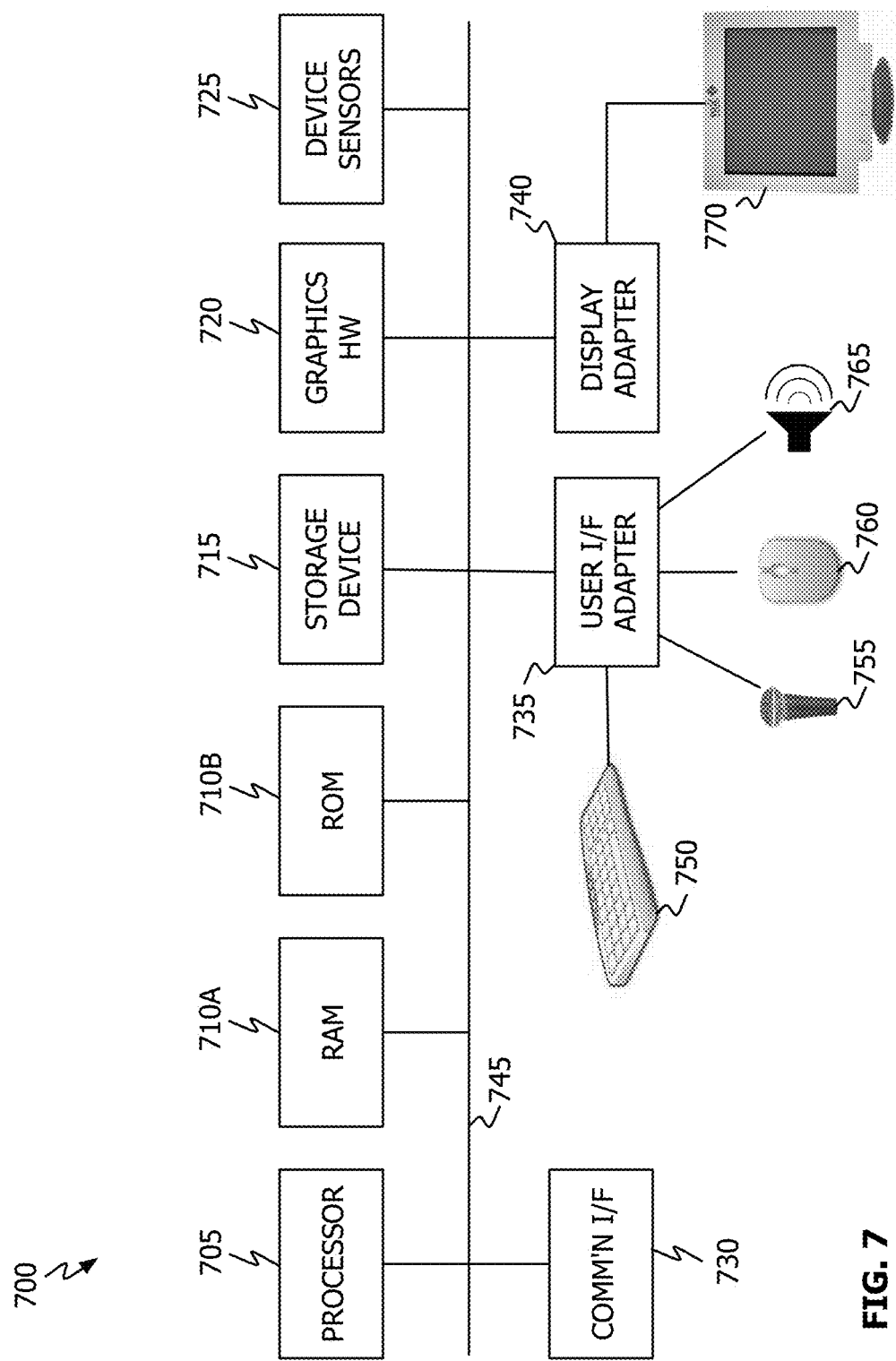
FIG. 7 shows, in block diagram form, a computer system in accordance with one embodiment.

Referring to FIG. 7, the disclosed embodiments of an object tracking operation in accordance with the above may be performed by representative computer system 700 (e.g., a general purpose computer system such as a desktop, laptop, notebook or tablet computer system). Computer system 700 may include one or more processors 705, memory 710 (710A and 710B), one or more storage devices 715, graphics hardware 720, device sensors 725 (e.g., 3D depth sensor, proximity sensor, ambient light sensor, accelerometer and/or gyroscope), communication interface 730, user interface adapter 735 and display adapter 740—all of which may be coupled via system bus or backplane 745 which may be comprised of one or more continuous (as shown) or discontinuous communication links. Memory 710 may include one or more different types of media (typically solid-state) used by processor 705 and graphics hardware 720. For example, memory 710 may include memory cache, read-only memory (ROM), and/or random access memory (RAM). Storage 715 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 710 and storage 715 may be used to retain media (e.g., audio, image and video files), preference information, device profile information, computer program instructions or code organized into one or more modules and written in any desired computer programming language, and any other suitable data. When executed by processor(S) 705 and/or graphics hardware 720 such computer program code may implement one or more of the methods described herein. Communication interface 730 may be used to connect computer system 700 to one or more networks. Illustrative networks include, but are not limited to, a local network such as a USB network, an organization's local area network, and a wide area network such as the Internet. Communication interface 730 may use any suitable technology (e.g., wired or wireless) and protocol (e.g., Transmission Control Protocol (TCP), Internet Protocol (IP), User Datagram Protocol (UDP), Internet Control Message Protocol (ICMP), Hypertext Transfer Protocol (HTTP), Post Office Protocol (POP), File Transfer Protocol (FTP), and Internet Message Access Protocol (IMAP)). User interface adapter 735 may be used to connect keyboard 750, microphone 755, pointer device 760, speaker 765 and other user interface devices such as a touch-pad and/or a touch screen (not shown). Display adapter 740 may be used to connect one or more display units 770 which may provide touch input capability. Processor 705 may be a system-on-chip such as those found in mobile devices and include one or more dedicated graphics processing units (GPUs). Processor 705 may be based on reduced instruction-set computer (RISC) or complex instruction-set computer (CISC) architectures or any other suitable architecture and may include one or more processing cores. Graphics hardware 720 may be special purpose computational hardware for processing graphics and/or assisting processor 705 perform computational tasks. In one embodiment, graphics hardware 720 may include one or more programmable GPUs and each such unit may include one or more processing cores.

Figure 8:
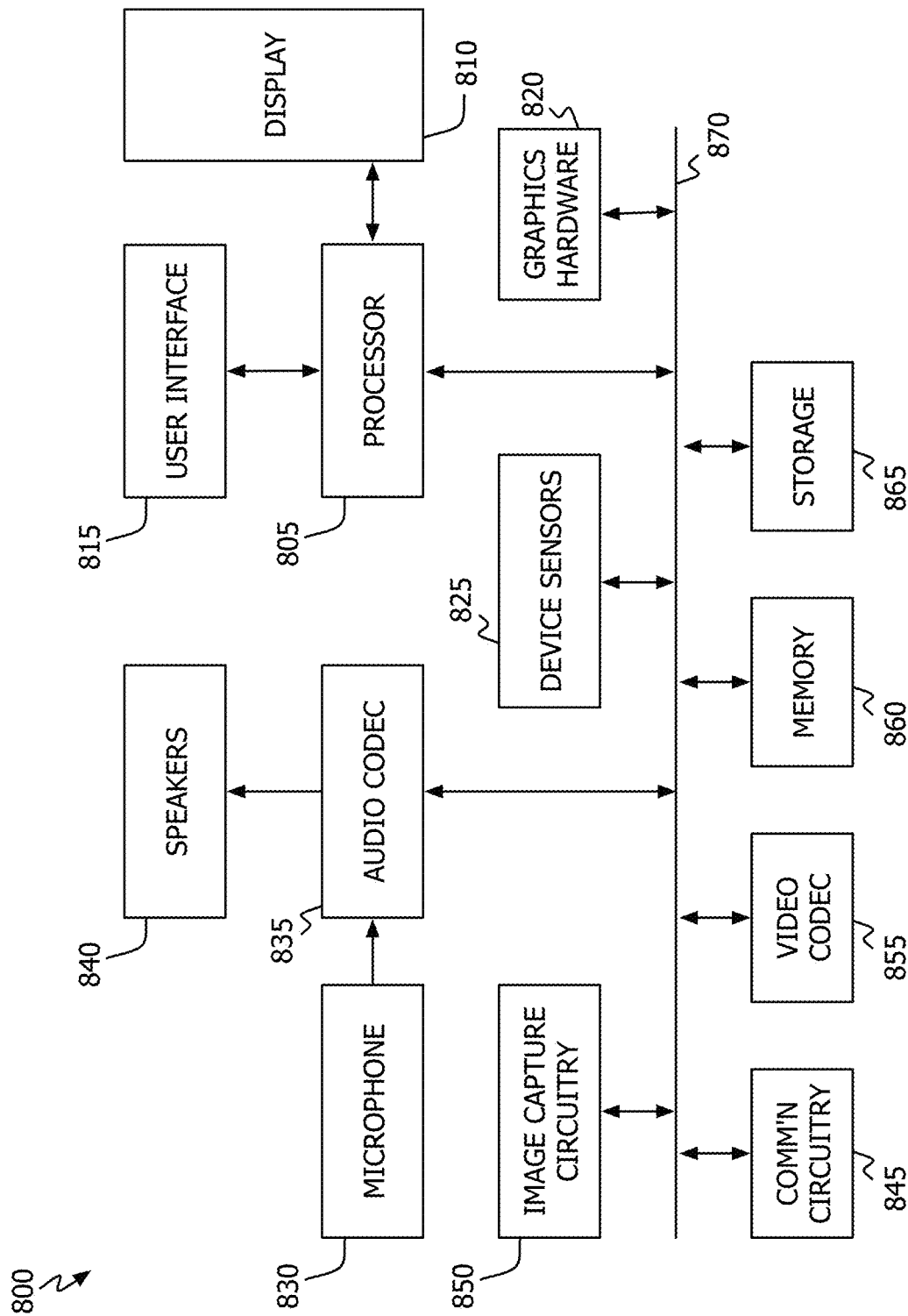
FIG. 8 shows, in block diagram form, a multi-function electronic device in accordance with one embodiment.

Referring to FIG. 8, a simplified functional block diagram of illustrative electronic device 800 is shown according to one embodiment. Electronic device 800 could be, for example, a mobile telephone, personal media device, portable camera, or a tablet, notebook or even a desktop computer system. As shown, electronic device 800 may include processor 805, display 810, user interface 815, graphics hardware 820, device sensors 825 (e.g., 3D depth sensor, proximity sensor, ambient light sensor, accelerometer and/or gyroscope), microphone 830, audio codec(s) 835, speaker(s) 840, communications circuitry 845, image capture circuit or unit 850, video codec(s) 855, memory 860, storage 865, and communications bus 870. Processor 805, graphics hardware 820, device sensors 825, microphone 830, communications circuitry 845, memory 860, storage 865, and communications bus 870 provide can provide the same function as do similarly named elements in FIG. 7. Image capture circuitry 850 may capture still and video images that may be processed in accordance with FIGS. 1-6. More specifically, output from image capture circuitry 850 may be processed, at least in part, by video codec(s) 855 and/or processor 805 and/or graphics hardware 820, and/or a dedicated image processing unit incorporated within circuitry 850 (e.g., an image processing pipeline) to provide the functionality disclosed herein.

While computer system 700 has been shown with fewer elements than portable device 800 (e.g., image capture unit 850 and video codecs 855), this need not be the case. For example, computer system 700 may have all the functional elements of device 800 including a touch interface provided by display 810 and user interface 815. In another embodiment, computer system 700 has more functional elements than device 800 such as a dedicated vector processing unit (not shown). In still another embodiment, computer system 700 has fewer functional elements than device 800. For example, computer system 700 may not include image capture or video codec functionality.

It is to be understood that the above description is intended to be illustrative, and not restrictive. For example, in the above templates have been described as square, being N-by-N while ROIs have not been so restricted. These constraints are not necessary to any implementation. That is, templates need not be square while ROIs may be. Further, overscan region 400A need not be expanded equally in both the horizontal and vertical directions as disclosed. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). In one or more embodiments, one or more of the steps disclosed in FIGS. 1-6 may be omitted, repeated, and/or performed in a different order than that described herein. For example, operations in accordance with block 605 need not be implemented. That is, each identified template may be retained in memory 610A. Accordingly, the specific arrangement of steps or actions shown in FIGS. 1-6 should not be construed as limiting the scope of the disclosed subject matter. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. An object tracking method, comprising:
   receiving an initial frame from a temporal sequence of frames, the initial frame having an initial region-of-interest (ROI), every ROI having a size and location;
   determining an initial template of the initial frame based on the initial ROI and a specified size;
   receiving a first frame from the temporal sequence of frames, the first frame arriving later in the temporal sequence of frames than the initial frame;
   identifying a first region of the first frame based on the initial ROI;
   finding a first plurality of first metric values based on the first region and a cost function;
   determining a first location of a first ROI of the first frame based on the plurality of first metric values;
   determining a second plurality of putative ROIs for the first frame, each putative ROI having a different size and centered at the first location;
   determining a second metric value for each of the putative ROIs; and
   selecting one of the putative ROIs as the first frame's first ROI based on the second metric values.

2. The method of claim 1, wherein the initial ROI comprises less than the entire initial frame.

3. The method of claim 2, wherein determining an initial template comprises:
   down-sampling the initial ROI to the specified size; and
   determining a color gradient of the down-sampled initial ROI.

4. The method of claim 3, further comprising determining a color descriptor of the down-sampled initial ROI.

5. The method of claim 4, wherein identifying a first region of the first frame comprises:
   identifying a temporary region of the first frame corresponding to the initial ROI of the initial frame; and
   overscanning the temporary region.

6. The method of claim 5, wherein the cost function is based on a congruence between the initial template and each n-by-n sub-region of the first frame's first region, wherein 'n' indicates the amount of overscan of the temporary region.

7. The method of claim 6, wherein determining a second metric value for each of the putative ROIs comprises, for each putative ROI:
   selecting a region centered about the first location, the region having a size;
   converting the region to the specified size;
   finding an edge map of the converted region; and
   finding a value indicative of the congruence between the initial template and the edge map of the converted region.

8. The method of 1, further comprising:
   determining a first edge map of the first frame based on the first ROI;
   combining the first edge map with a plurality of other edge maps to generate an updated template, wherein each of the plurality of other edge maps corresponds to an ROI of a different frame from the temporal sequence of frames, each of the plurality of other frames arriving earlier in the temporal sequence of frames than the first frame; and
   using the updated template as the initial template when evaluating a next frame from the temporal sequence of frames, the next frame arriving later in the temporal sequence of frames than the first frame.

9. An object tracking digital image capture unit, comprising:
   an image sensor;
   a lens system configured to focus light from a scene onto the image sensor;
   a memory communicatively coupled to the image sensor and configured to store multiple images from the image sensor; and
   one or more processors coupled to the lens system and the memory, the one or more processors configured for—
      receiving an initial frame from a temporal sequence of frames, the initial frame having an initial region-of-interest (ROI), every ROI having a size and location;
      determining an initial template of the initial frame based on the initial ROI and a specified size;
      receiving a first frame from the temporal sequence of frames, the first frame arriving later in the temporal sequence of frames than the initial frame;
      identifying a first region of the first frame based on the initial ROI;
      finding a first plurality of first metric values based on the first region and a cost function;
      determining a first location of a first ROI of the first frame based on the plurality of first metric values;
      determining a second plurality of putative ROIs for the first frame, each putative ROI having a different size and centered at the first location;
      determining a second metric value for each of the putative ROIs; and
      selecting one of the putative ROIs as the first frame's first ROI based on the second metric values.

10. The digital image capture unit of claim 9, wherein the initial ROI comprises less than the entire initial frame.

11. The digital image capture unit of claim 10, wherein determining an initial template comprises:
    down-sampling the initial ROI to the specified size; and
    determining a color gradient of the down-sampled initial ROI.

12. The digital image capture unit of claim 11, wherein the one or more processors are further configured for determining a color descriptor of the down-sampled initial ROI.

13. The digital image capture unit of claim 12, wherein identifying a first region of the first frame comprises:
    identifying a temporary region of the first frame corresponding to the initial ROI of the initial frame; and
    overscanning the temporary region.

14. The digital image capture unit of claim 13, wherein the cost function is based on a congruence between the initial template and each n-by-n sub-region of the first frame's first region, wherein 'n' indicates the amount of overscan of the temporary region.

15. The digital image capture unit of claim 14, wherein determining a second metric value for each of the putative ROIs comprises, for each putative ROI:
    selecting a region centered about the first location, the region having a size;
    converting the region to the specified size;
    finding an edge map of the converted region; and
    finding a value indicative of the congruence between the initial template and the edge map of the converted region.

16. The digital image capture unit of 9, wherein the one or more processors are further configured for:
    determining a first edge map of the first frame based on the first ROI;
    combining the first edge map with a plurality of other edge maps to generate an updated template, wherein each of the plurality of other edge maps corresponds to an ROI of a different frame from the temporal sequence of frames, each of the plurality of other frames arriving earlier in the temporal sequence of frames than the first frame; and
    using the updated template as the initial template when evaluating a next frame from the temporal sequence of frames, the next frame arriving later in the temporal sequence of frames than the first frame.

17. A non-transitory program storage device comprising instructions stored thereon to cause one or more processors to:
    receive an initial frame from a temporal sequence of frames, the initial frame having an initial region-of-interest (ROI), every ROI having a size and location;
    determine an initial template of the initial frame based on the initial ROI and a specified size;
    receive a first frame from the temporal sequence of frames, the first frame arriving later in the temporal sequence of frames than the initial frame;
    identify a first region of the first frame based on the initial ROI;
    find a first plurality of first metric values based on the first region and a cost function;
    determine a first location of a first ROI of the first frame based on the plurality of first metric values;
    determine a second plurality of putative ROIs for the first frame, each putative ROI having a different size and centered at the first location;
    determine a second metric value for each of the putative ROIs; and
    select one of the putative ROIs as the first frame's first ROI based on the second metric values.

18. The non-transitory program storage device of claim 17, wherein the initial ROI comprises less than the entire initial frame.

19. The non-transitory program storage device of claim 18, wherein the instructions to determine an initial template comprise instructions to:
    down-sample the initial ROI to the specified size; and
    determine a color gradient of the down-sampled initial ROI.

20. The non-transitory program storage device of claim 19, further comprising instructions to determine a color descriptor of the down-sampled initial ROI.

21. The non-transitory program storage device of claim 20, wherein instructions to identify a first region of the first frame comprise instructions to:
    identify a temporary region of the first frame corresponding to the initial ROI of the initial frame; and
    overscan the temporary region.

22. The non-transitory program storage device of claim 21, wherein the cost function is based on a congruence between the initial template and each n-by-n sub-region of the first frame's first region, wherein 'n' indicates the amount of overscan of the temporary region.

23. The non-transitory program storage device of claim 22, wherein instructions to determine a second metric value for each of the putative ROIs comprise instructions to, for each putative ROI:
    select a region centered about the first location, the region having a size;
    convert the region to the specified size;
    find an edge map of the converted region; and
    find a value indicative of the congruence between the initial template and the edge map of the converted region.

24. The non-transitory program storage device of 17, further comprising instructions to:
    determine a first edge map of the first frame based on the first ROI;
    combine the first edge map with a plurality of other edge maps to generate an updated template, wherein each of the plurality of other edge maps corresponds to an ROI of a different frame from the temporal sequence of frames, each of the plurality of other frames arriving earlier in the temporal sequence of frames than the first frame; and
    use the updated template as the initial template when evaluating a next frame from the temporal sequence of frames, the next frame arriving later in the temporal sequence of frames than the first frame.

* * * * *